(12) United States Patent
Pratt

(10) Patent No.: US 6,715,404 B2
(45) Date of Patent: Apr. 6, 2004

(54) SPRINKLER UNIT FOR FERMENTING SYSTEM

(76) Inventor: Anthony L. Pratt, 6355 Champagne La., Paso Robles, CA (US) 93446

( * ) Notice: Subject to any disclaimer, the term of this patent is extended or adjusted under 35 U.S.C. 154(b) by 0 days.

(21) Appl. No.: 10/104,589

(22) Filed: Mar. 21, 2002

(65) Prior Publication Data

US 2003/0177911 A1 Sep. 25, 2003

(51) Int. Cl.$^7$ .............................. C12F 11/00; B05B 3/02
(52) U.S. Cl. .............................. 99/277; 99/487; 99/516; 239/214.13; 239/222.17
(58) Field of Search .................... 99/276, 277, 278, 99/476, 467, 487, 516, 473, 474; 239/214.13, 214, 222.17, 224, 222.11, 222.15, 225.1, 231, 233, 522, 523, 524; D23/220

(56) References Cited

U.S. PATENT DOCUMENTS

| 453,055 A | * | 5/1891 | Ware ..................... 239/222.17 |
| 477,164 A | | 6/1892 | Baker |
| 1,575,895 A | | 3/1926 | Baker |
| 1,609,047 A | * | 11/1926 | Beale ..................... 239/222.17 |
| 1,890,084 A | | 12/1932 | Hamm et al. |
| 1,933,428 A | | 10/1933 | Harry |
| 2,489,952 A | | 11/1949 | Boudreaux et al. |
| 2,536,994 A | * | 1/1951 | Cremaschi .................... 99/276 |
| 3,478,669 A | | 11/1969 | Lanes |
| 3,532,273 A | * | 10/1970 | Siddall et al .......... 239/222.17 |
| 3,823,655 A | | 7/1974 | Potter |
| 3,871,272 A | * | 3/1975 | Melandri ..................... 99/276 |
| 4,512,251 A | | 4/1985 | Green |
| 4,796,811 A | * | 1/1989 | Davisson ............... 239/222.17 |
| 6,125,736 A | | 10/2000 | Marin |
| 6,279,457 B1 | | 8/2001 | Francia |

* cited by examiner

Primary Examiner—Reginald L. Alexander
(74) Attorney, Agent, or Firm—Thomas F. Lebens; Sinsheimer, Schiebelhut & Baggett

(57) ABSTRACT

A sprinkler for a fermenting system comprises a nozzle having an inlet opening and an outlet opening with a support arm having a first end attached to the nozzle. The support arm is shaped in a fashion to position a second end of the support arm substantially centered below the outlet opening of the nozzle. A plurality of vanes form a vane structure which is rotatably attached to the second end of the support arm. It has an axis of rotation through the center of the inlet opening and outlet opening. A conical shaped structure is attached to the center of the top planar surface of the vane structure.

14 Claims, 12 Drawing Sheets

SPRINKLER UNIT FOR FERMENTING SYSTEM

BACKGROUND OF THE INVENTION

The present invention relates to improvements in winemaking apparatus and more particularly to apparatus for fermentation of wine.

Generally, in making red wine, grapes are crushed to provide a suspension of heavy parts (chiefly seeds) and light parts (pulp and skins) in grape juice. This suspension is called must. Thereafter, the must is placed into a fermentation tank so that the grape sugars found in the must can be converted to ethanol, either by the addition of specific strains of yeast, or naturally with wild yeast found on grape skins.

During this process, carbon dioxide is produced, which causes a separation of the juice downward and the lighter products, which float to form a cap on top of the fermentation vessel.

The cap contains naturally produced chemicals that are necessary for good wine quality, and they can be recovered by remixing the cap with the underlying juice. Traditional methods of remixing include pumping the juice from the bottom of the fermentation tank to the top of the tank and spraying the cap with the juice, which extracts the necessary chemicals into the juice. This known process has disadvantages in that there is not good recovery of the necessary cap chemicals due to lack of uniformity in cap spraying. Also, the current pumpover devices often become clogged with pulp, skins and seeds and thus become ineffective.

The present invention advantageously addresses the above and other needs.

SUMMARY OF THE INVENTION

The present invention advantageously addresses the needs above as well as other needs by providing an improved sprinkler unit for a fermenting system.

In one embodiment, the invention can be characterized as a sprinkler for a fermenting system comprising a nozzle having an inlet opening and an outlet opening with a support arm having a first end attached to the nozzle. The support arm is shaped in a fashion to position a second end of the support arm substantially centered below the outlet opening of the nozzle. A plurality of vanes form a vane structure which is rotatably attached to the second end of the support arm. The vane structure has an axis of rotation through the center of the outlet opening. The plurality of vanes extend outward and radially from a center of the vane structure; and the support arm is shaped in a fashion to not interfere with rotation of the vane structure. A conically shaped structure is attached to a center of a top planar surface of the vane structure.

In another embodiment, the invention can be characterized as a fermenting system with a recirculating system. The sprinkler unit described above is attached to an upper nozzle of a recirculating pipe coming down from the center of the top of a fermenting tank.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1A:
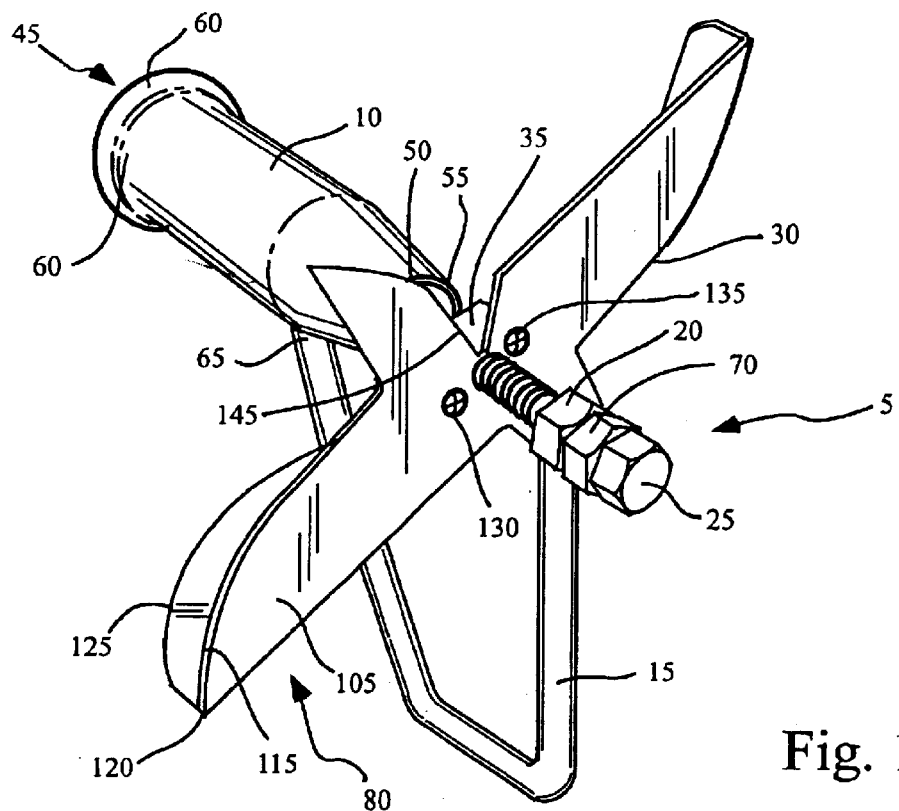
FIG. 1A is a bottom perspective view of a sprinkler unit for a fermenting system in accordance with one embodiment of the present invention.
Figure 1B:
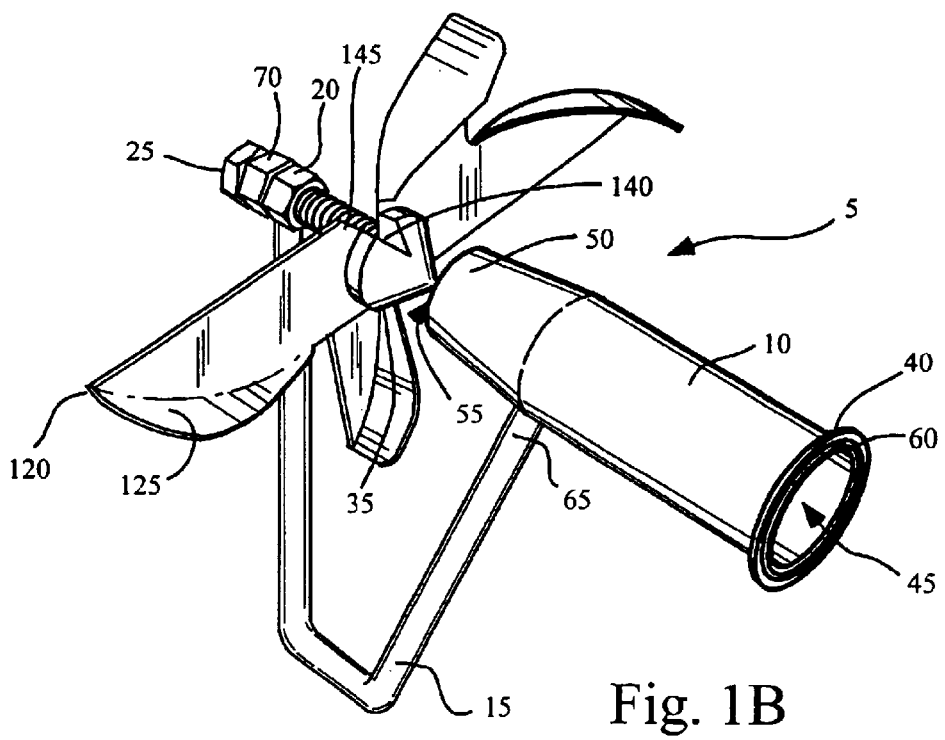
FIG. 1B is a top perspective view of the wine sprinkler unit of FIG. 1A.

Referring first to FIG. 1A and FIG. 1B, shown are bottom and top perspective views, respectively, of a sprinkler unit 5 for a fermenting system in accordance with one embodiment of the present invention. In particular, shown are a nozzle 10, a support arm 15, a threaded nut 20, a bolt 25, a vane structure 30, and a conical structure 35.

The nozzle 10 is shown having a first end 40 with an inlet opening 45 and a second end 50 with an outlet opening 55. The first end 40 has a lip 60 around the perimeter of the round inlet opening 40. The nozzle 10 is substantially cylindrical until it tapers (frustocomically) from a point that is more than halfway toward the second end 50 from the first end. The outlet opening 55 is thereby smaller in diameter than the inlet opening 45. The support arm 15 is shown having a first end 65 attached to an exterior of the nozzle 10 near the point that is more than halfway toward the second end 50 and on a portion of the nozzle where the nozzle tapers. In the present embodiment, the support arm 15 is welded to the exterior of the nozzle 10. The support arm 15 extends outward from the exterior of the nozzle 10 and bends in substantially a "U" shape back toward the second end 50 of the nozzle 10 such that the second end of the support arm 15 is over the outlet opening 55 of the nozzle 10.

Figure 2:
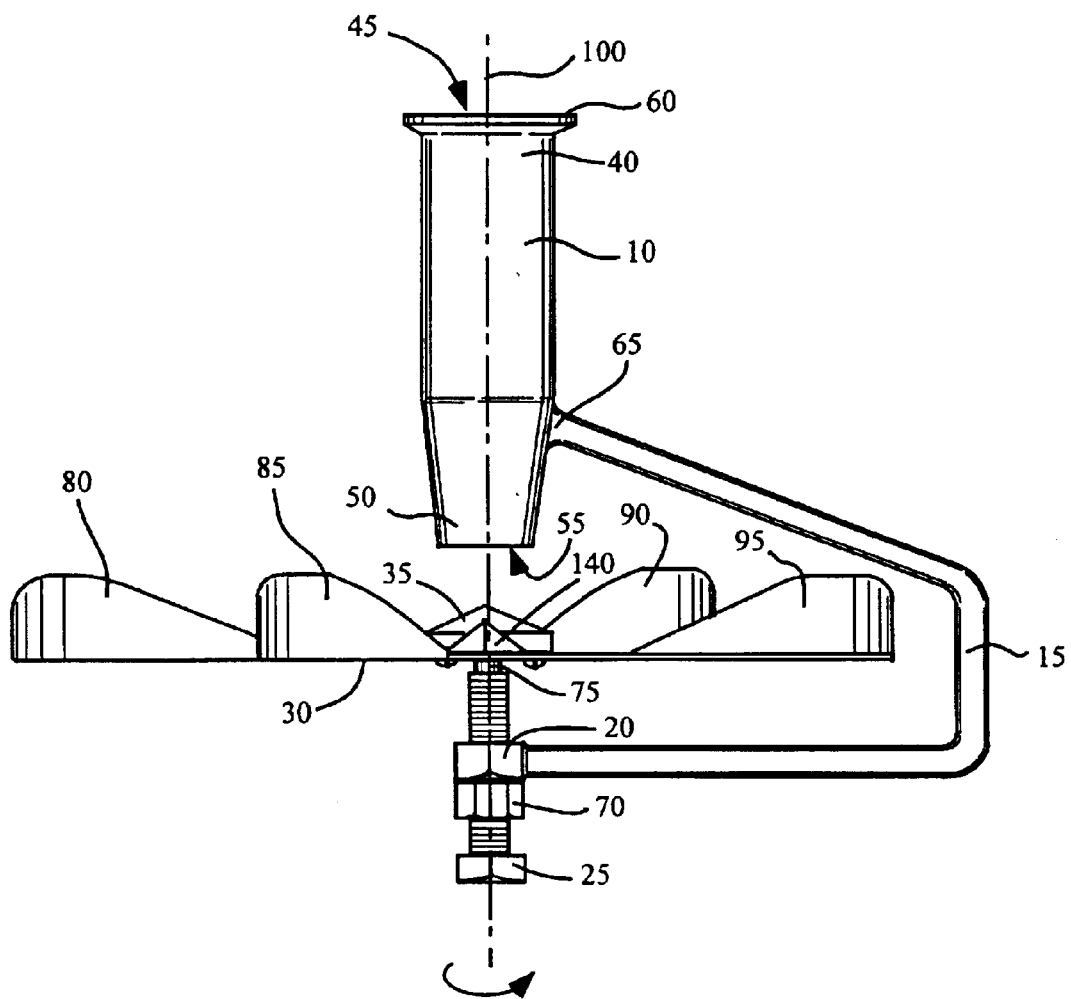
FIG. 2 is a side elevational view of the wine sprinkler unit of FIGS. 1A and 1B.

Referring next to FIG. 2, shown is a side elevational view of the wine sprinkler unit 5 of FIGS. 1A and 1B. In particular, shown are the nozzle 10, the support arm 15, the threaded nut 20, and the bolt 25 (having a spindle 75 on one end), the vane structure 30, and the conical structure 35.

The threaded nut 20 forms the second end 65 of the support arm 15 against which (e.g., on top of or beneath which) another threaded nut 70 is tightened in order to lock the bolt 25 into place. The bolt 25 is screwed through the threaded nut 20 that forms the second end of the support arm 15 and through the other threaded nut 70 thereby securing the bolt 25 and allowing adjustment of the length of the portion of the bolt 25 that extends up from the threaded nut 20 towards the outlet opening 55. Rotatably attached to a spindle 75 located at a distal end of the bolt 25 are a plurality of vanes 80, 85, 90, 95 (four in the present embodiment). The plurality of vanes 80, 85, 90, 95 form a single vane structure 30 having an axis of rotation 100 coincident with the central axis of the inlet 45 and outlet 55 openings of the nozzle 10.

Figure 3A:
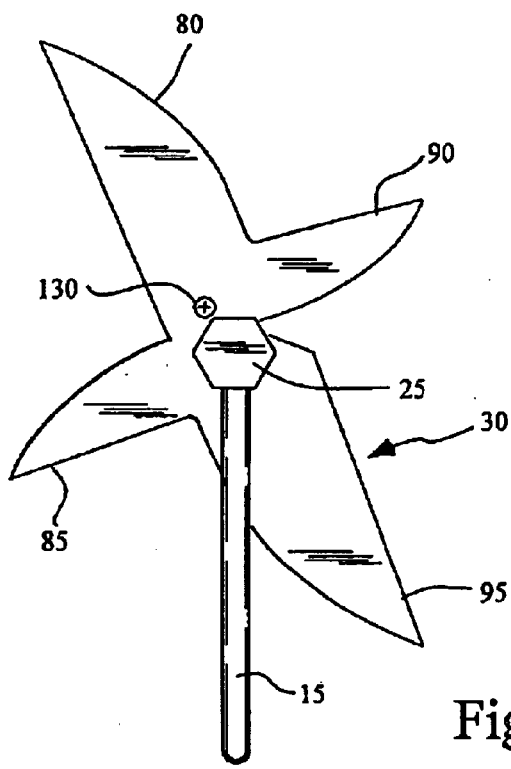
FIG. 3A is a bottom planar view of the wine sprinkler unit of FIGS. 1A and 1B.
Figure 3B:
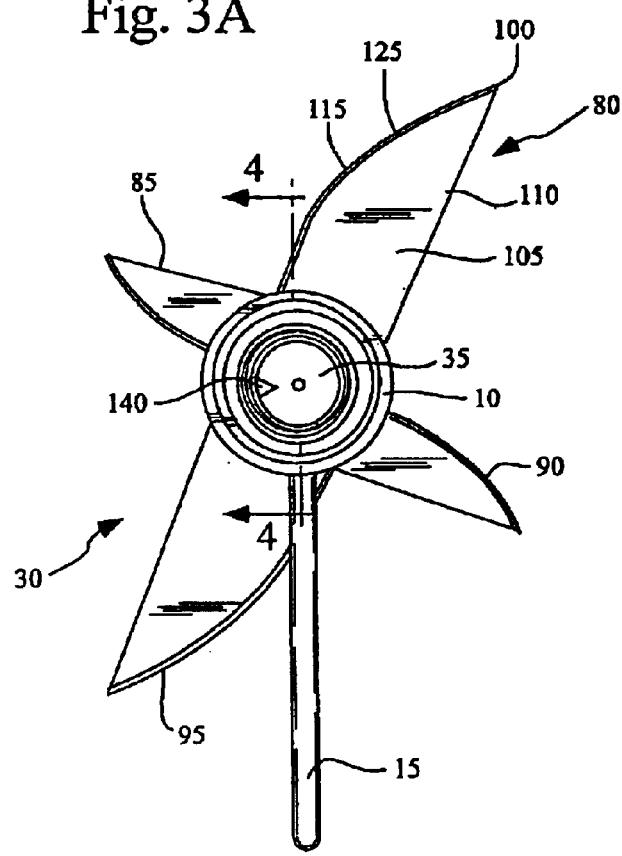
FIG. 3B is a top planar view of the wine sprinkler unit of FIGS. 1A and 1B.

Referring next to FIG. 3A and 3B, shown are a bottom and top planar view, respectively, of the wine sprinkler unit 5 of FIGS. 1A and 1B. In particular, shown are the nozzle 10, the support arm 15, the bolt 25, the vane structure 30, and a conical structure 35.

The vane structure 30 comprises two longer vanes 80, 95 (each of substantially a first radial length) and two shorter vanes 85, 90 (each of substantially a second radial length; the second radial length is approximately two thirds the length of the longer vanes 80, 95). In accordance with the present embodiment, each vane 80 has a support arm 105, the planar surface of which is substantially perpendicular to the axis of rotation 100. Each vane support arm 105 has a straight edge 110 and a curved edge 115 that extend radially outward roughly perpendicular to the axis of rotation 100 and that meet at a point 120 defining an outward end 120 of the vane 80, 85, 90, 95. Along the edge of the curved portion 115 of the vane 80 (and along similar curved portions of each of the other vanes 85, 90, 95) is a face portion 125 of vane 80. The face portion 125 of the vane 80 is substantially perpendicular to the planar surface of the vane support arm 105 and gradually increases in height as it extends toward the outward end 120 of the vane support arm 105.

Figure 4:
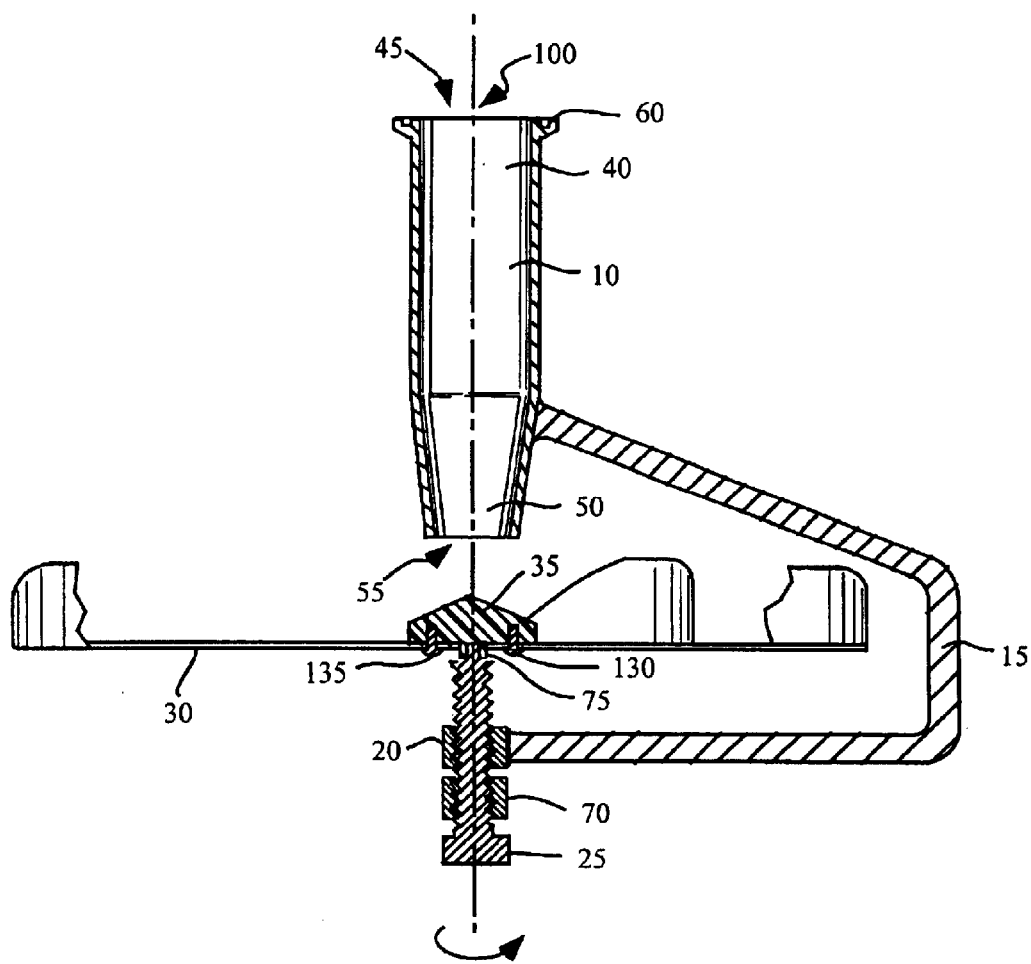
FIG. 4 is a side cross sectional view of the wine sprinkler unit of FIGS. 1A and 1B.

Referring next to FIG. 4, shown is a side cross sectional view of the wine sprinkler unit 5 of FIGS. 1A and 1B. In particular, shown are the nozzle 10, the support arm 15, the nut 20, and the bolt 25 having a spindle 75 on one end, the vane structure 30, and the conical structure 35.

The conical structure (cone) 35, preferably made of plastic, is attached to a center of the vane structure by two screws 130, 135. The base of the cone 35 abuts the top planar surface of the vane structure 30 such that the tip of the cone 35 points up toward the outlet opening 55 of the nozzle 10 and is in coaxial alignment with the axis of rotation 100 for the vane structure 30. There is a notch 140 in the side of the cone 35 and, a matching notch 145 of the same shape in the vane structure 30 (as can be seen if FIG. 1A). The edges of the matching notch 145 in the vane structure 30 are aligned flush with the edges of the notch 140 in the cone 35.

Figure 5A:
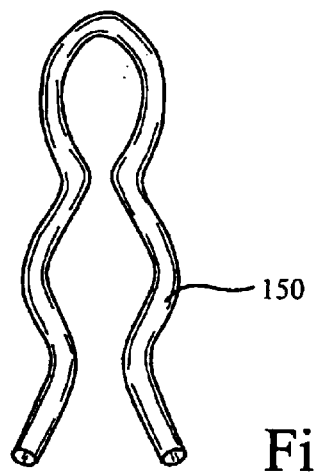
FIG. 5A is a side elevational view of a pin used for securing a vane structure to a spindle of the wine sprinkler unit of FIGS. 1A and 1B.
Figure 5B:
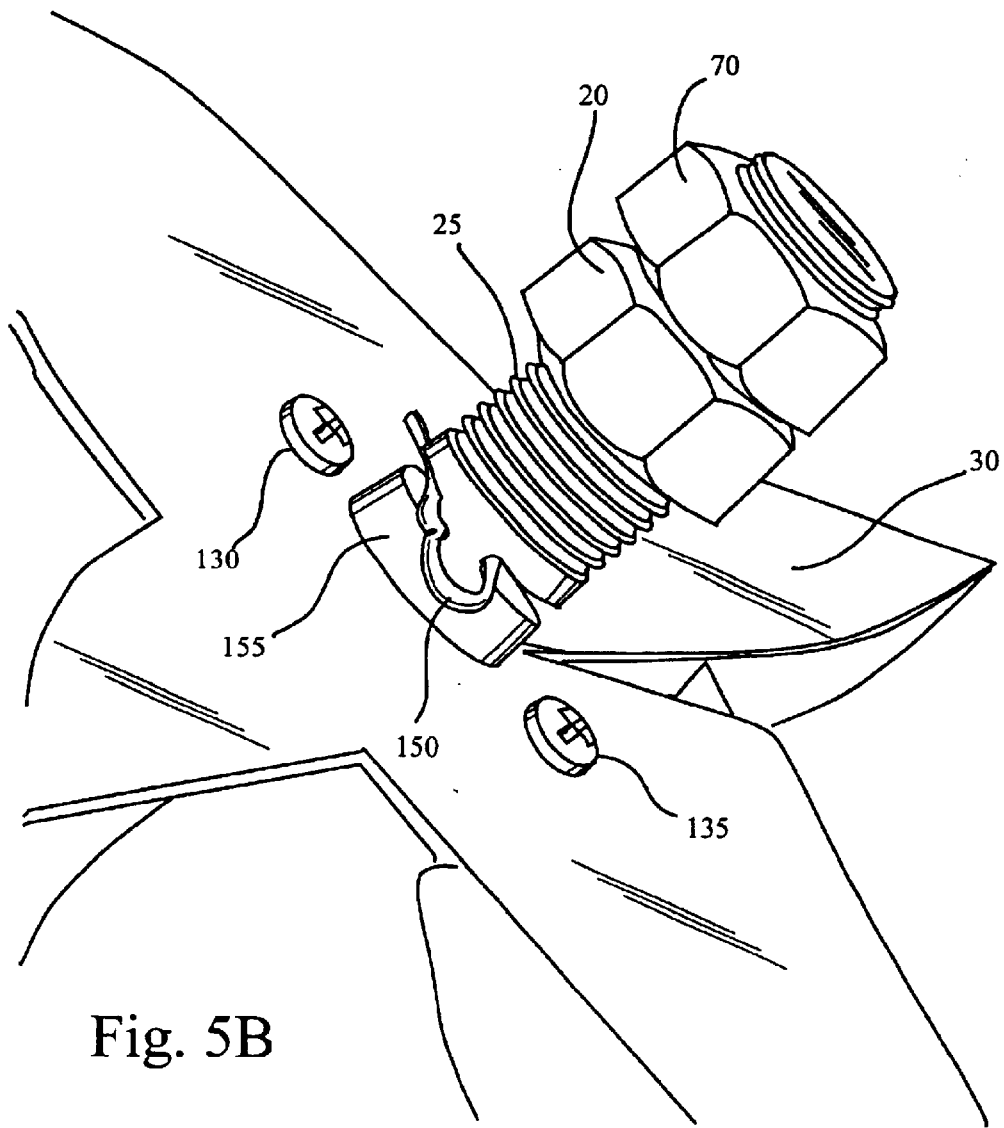
FIG. 5B is a partial bottom perspective view of the vane structure of the wine sprinkler unit of FIGS. 1A and 1B using the pin of FIG. 5A.

Referring next to FIG. 5A and FIG. 5B, shown in FIG. 5A is a side elevational view of a pin 150 used for securing the vane structure 30 to the spindle 75 of the bolt 25 of the wine sprinkler unit 5 of FIGS. 1A and 1B.

Shown in FIG. 5B is a partial bottom perspective view of the vane structure 30 of the wire sprinkler unit 5 and the spindle 75 (obscured by the vane structure 30) of the bolt 25 of the wine sprinkler unit 5 of FIGS. 1A and 1B using the pin of FIG. 5A. In particular, shown is the bolt 25, the threaded nut 20 forming the second end of the support arm 15, the other threaded nut 70 for securing the bolt 25, the pin 150, a pin holder 155, and a portion of the vane structure 30.

In the present embodiment, the vane structure 30 is secured to the spindle 75 using the pin 150, which is inserted into the pin holder 155, which is affixed to the vane structure 30. The vane structure 30 is secured to the spindle 75 as the pin 150 rests axially against a notch (not shown) in the spindle 75. The pin 150 is removable such that the vane structure 30 may be removed for maintenance or to replace it with the same or other types (e.g., other shapes and/or sizes) of vane structures.

Figure 6:
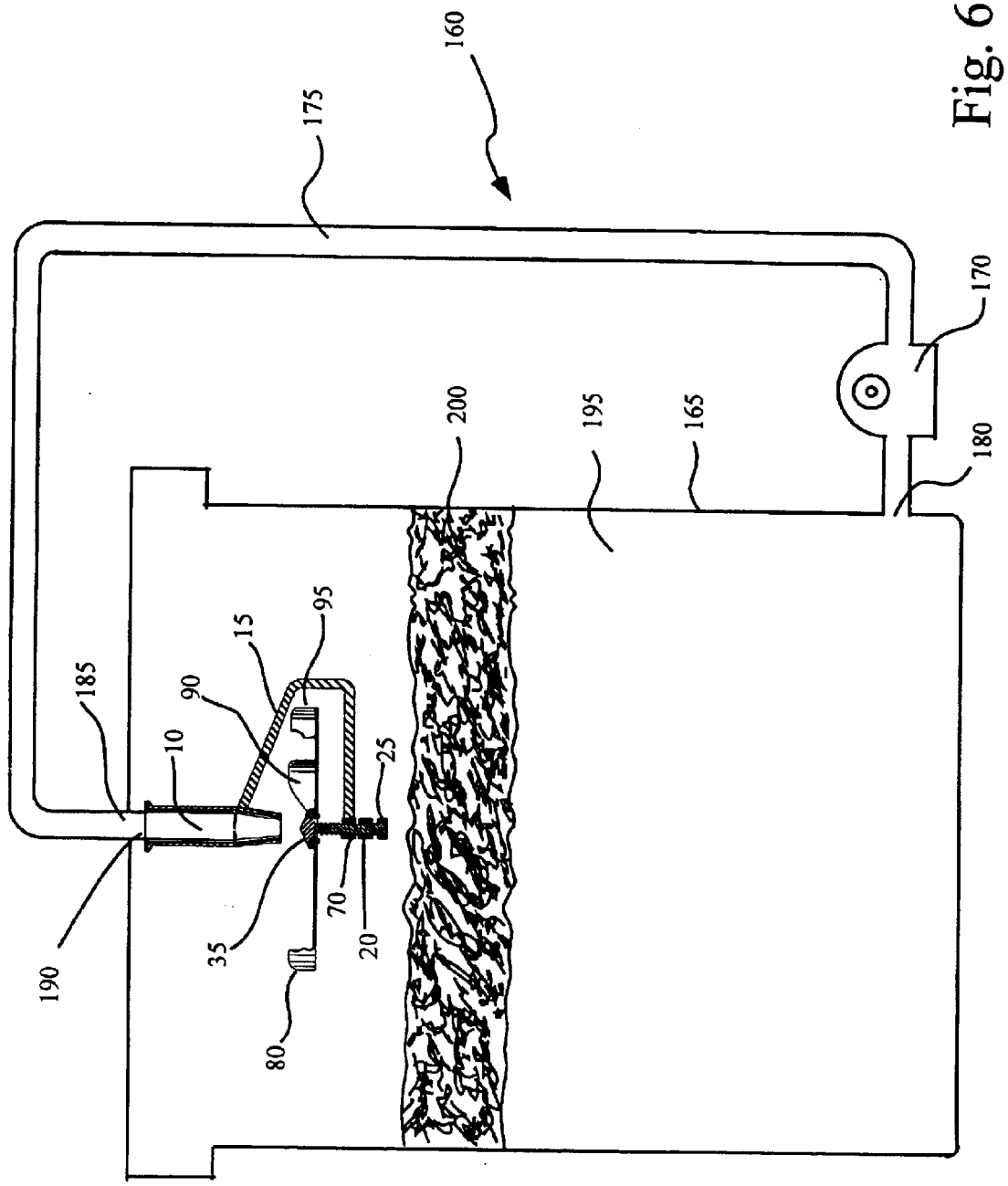
FIG. 6 is a side cross sectional view of a fermentation system using the wine sprinkler unit of FIGS. 1A and 1B.

Referring next to FIG. 6, shown is a side cross sectional view of a fermentation system 160 suitable for use with the sprinkler unit 5 of FIGS. 1A and 1B. In particular, shown is the sprinkler unit 5 of FIGS. 1A and 1B, a fermentation tank 165, and a circulating system comprising a recirculating pump 170 and a recirculating pipe 175.

The recirculating pipe 175 leads from the bottom 180 of the fermentation tank 165 through the top 185 of the fermentation tank 165 having an upper nozzle 190 that extends vertically downward through a center of the top 185 of the fermentation tank 165. An adjustable recirculating pump 170 is operably installed in line with the recirculating pipe 175. The sprinkler unit 5 is placed over the upper nozzle 190 on the recirculating pipe 175.

By way of operation, the sprinkler unit 5 is placed over the upper nozzle 190 on the recirculating pipe 175 within the fermentation tank 165 for fermenting, for example, wine. The recirculating pump 170 is used to pump the fermenting wine 195 to the top of the tank 185 above a cap 200 of the fermenting wine 195. The sprinkler unit nozzle 10 of the sprinkler unit, centrally located at the top 185 of the tank 165, ejects a stream of fermenting wine onto the cone 35 of the sprinkler unit that radially disburses a stream of wine. The radially disbursing stream of wine is deflected against the two shorter 85 (not shown), 90 and two longer, 80, 95 vanes of the vane structure 30, which rotate in response to the force of the radially disbursing stream of wine. This arrangement causes the fermenting wine 195 to be disbursed across the cap 200 with the shorter vanes 85, 90 directing a portion of the fermenting wine 195 in a radius proximate to the nozzle 10, and the longer vanes 80, 95 dispensing another portion of the fermenting wine 195 in a radius closer to a wall of the tank 165. The notch 140 in the cone 35 (as can be seen in FIG. 1B) directs a portion of the fermenting wine 195 to a region immediately below the vane structure 30. The vane structure 30 can be adjusted upwardly or downwardly (axially) by way of screwing or unscrewing the bolt 25 through the threaded nut 20 forming the second end of the support arm 15. This is in order to affect the radius of dispersion of the fermenting wine, i.e., when the vane structure 30 is moved closer to the outlet opening 55, a radius of dispersion is increased and when the vane structure 30 is moved farther from the outlet opening 55, the radius of dispersion is decreased.

Advantageously, the structures employed in accordance with the present embodiment provide no obstruction to the free flow of the fermenting wine 195. This is important because in prior attempts to address the issues addressed by the present invention, such obstructions provided a source of clogging as pulp, seeds, and skins built up against these obstructing structures.

Because the radius of the dispersion of the fermenting wine is controlled both by the raising and lowering of the vane structure 30, and cone 35, and the pressure of the stream of fermenting wine (i.e., the rate of pumping), the rate at which the tank 165 is "turned over," can be adjusted by adjusting the rate at which fermenting wine is pumped through the wine sprinkler unit 5 (having the effect of adjusting the pressure with which the stream of wine emerges from the nozzle 10), and, at the same time, the effect of this pressure adjustment can be compensated for, in terms of its effect on the radius of dispersion of the fermenting wine, by raising or lowering the vane structure 30 and cone 35 so as to maintain a prescribed desired radius of dispersion. For example, the vane structure 30 and cone 35 can be lowered when the rate at which the fermenting wine is pumped through the wine sprinkler unit 5 is increased in order to maintain a desired radius of dispersion, and vice versa.

Figure 7:
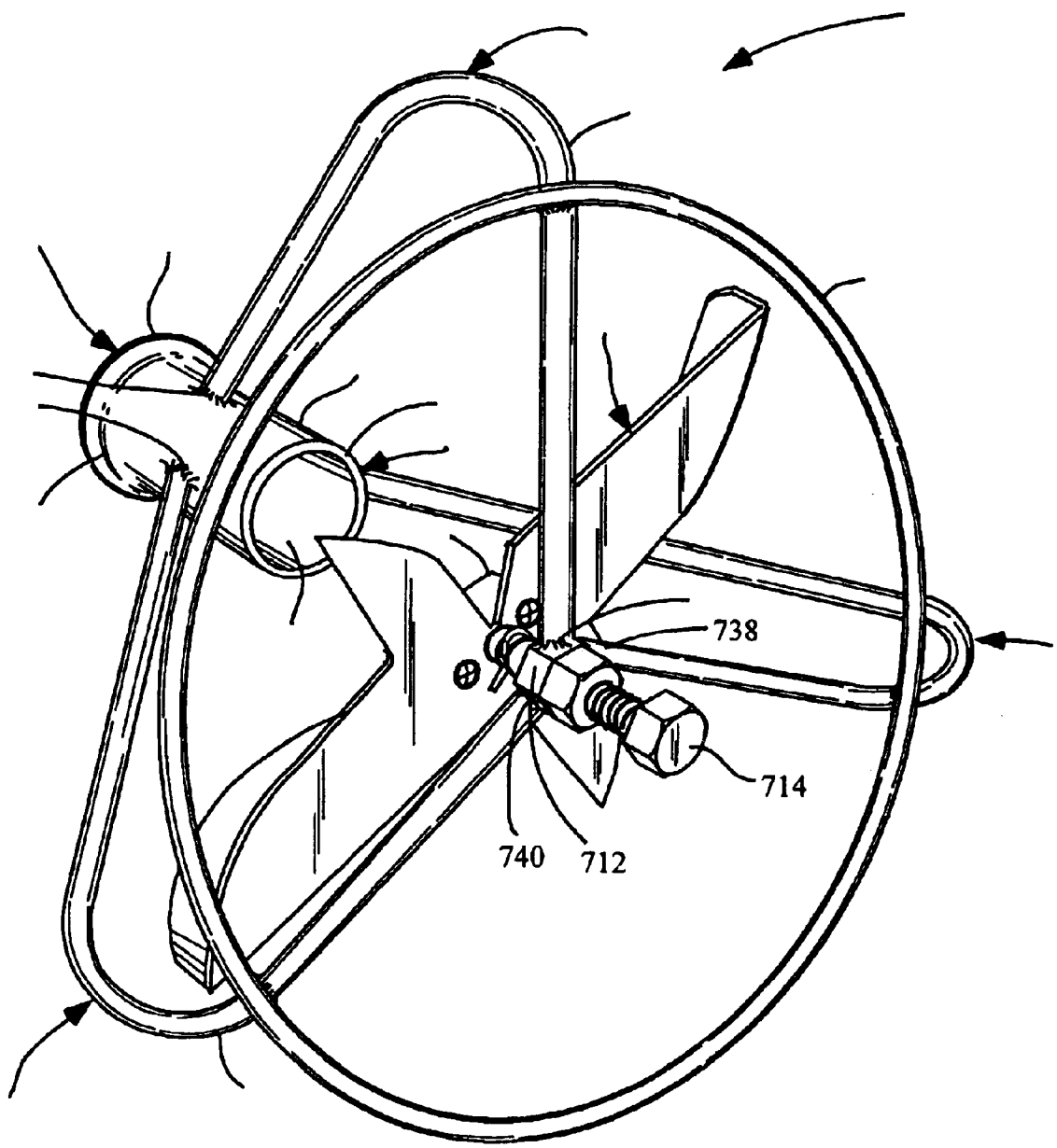
FIG. 7 is a bottom perspective view of an alternative embodiment of the wine sprinkler unit as shown in FIGS. 1A and 1B for a fermenting system.
Figure 8:
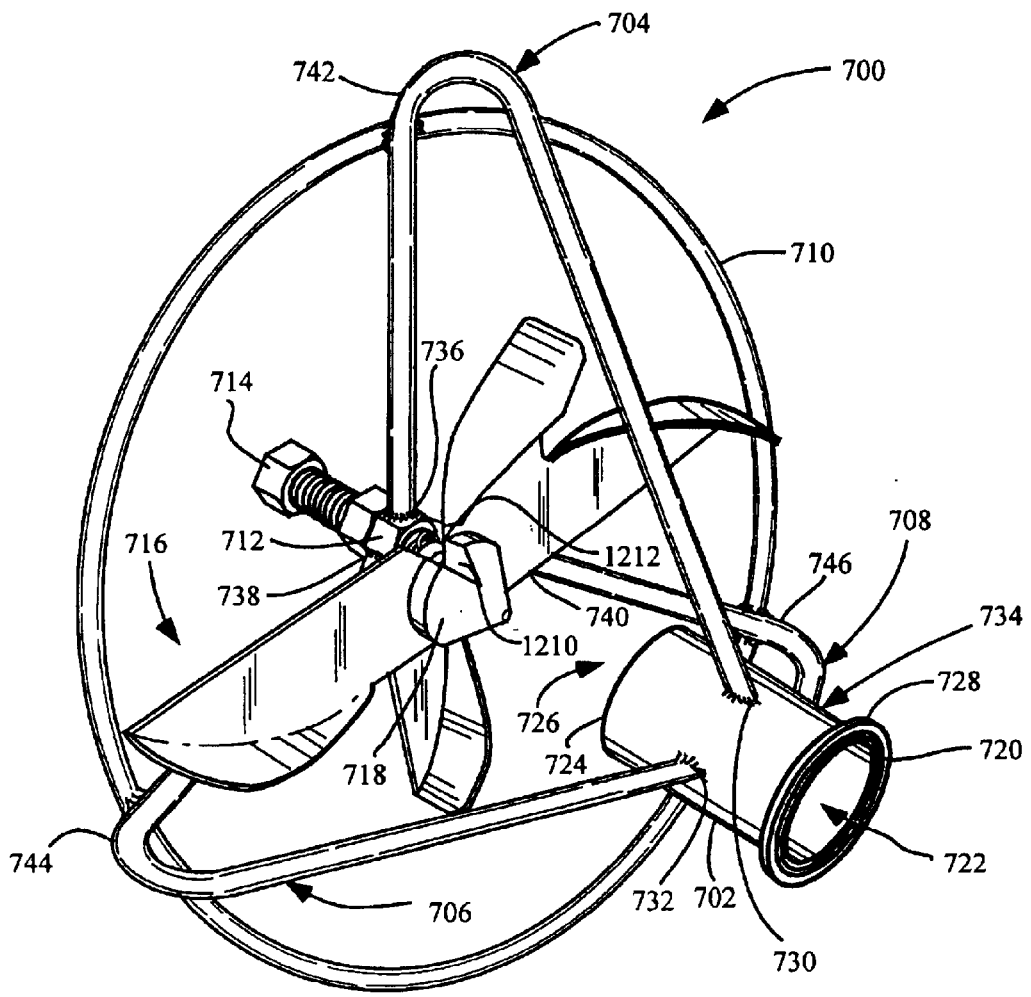
FIG. 8 is a top perspective view of the alternative embodiment of the wine sprinkler unit of FIGS. 7 and 8.

Referring next to FIGS. 7 and 8, shown are bottom and top perspective views respectively of an alternative embodiment of the wine sprinkler unit 700 for a fermenting system in accordance with the one embodiment of the present invention. Shown are a nozzle 702, a first support arm 704, a second support arm 706, a third support arm 708, a ring 710, a threaded nut 712, a bolt 714, a vane structure 716, and a conical structure 718.

The nozzle 702 is shown having a first end 720 with an inlet opening 722 and a second end 724 with an outlet opening 726. The first end 720 has a lip 728 around a perimeter of the inlet opening 722, which is substantially round. Unlike in the embodiment of FIGS. 1A and 1B, nozzle 702 of the present embodiment does not taper, i.e., the diameter at the second end 722 is substantially the same as the diameter of the first end 720. The first support arm 704, the second support arm 706, and the third support arm 708 are shown having respective first ends 730, 732, 734 attached to an exterior of the nozzle 702. In accordance with the present embodiment, the support arms 704, 706, 708 are welded to the nozzle 702. The support arms 704, 706, 708 extend outwardly from the exterior of the nozzle 702 and bend substantially in a "U" shape toward the outlet opening 724 of the nozzle 702 such that respective second ends 730, 738, 740 of the support arms 704, 706, 708 are over the outlet opening 724 of the nozzle 702. The support arms 704, 706, 708 are oriented at approximately 120 degrees relative to one another around a perimeter of the nozzle 702. At distal portions 742, 744, 748 of each support arm 704, 706, 708 just beyond the support arms' bend, is the guard ring 710 that serves a purpose of protecting the vane structure 716 when the wine sprinkler unit 700 is removed and may receive treatment such as dropping or rough placing of the sprinkler unit on the ground or floor of a winery.

Figure 9:
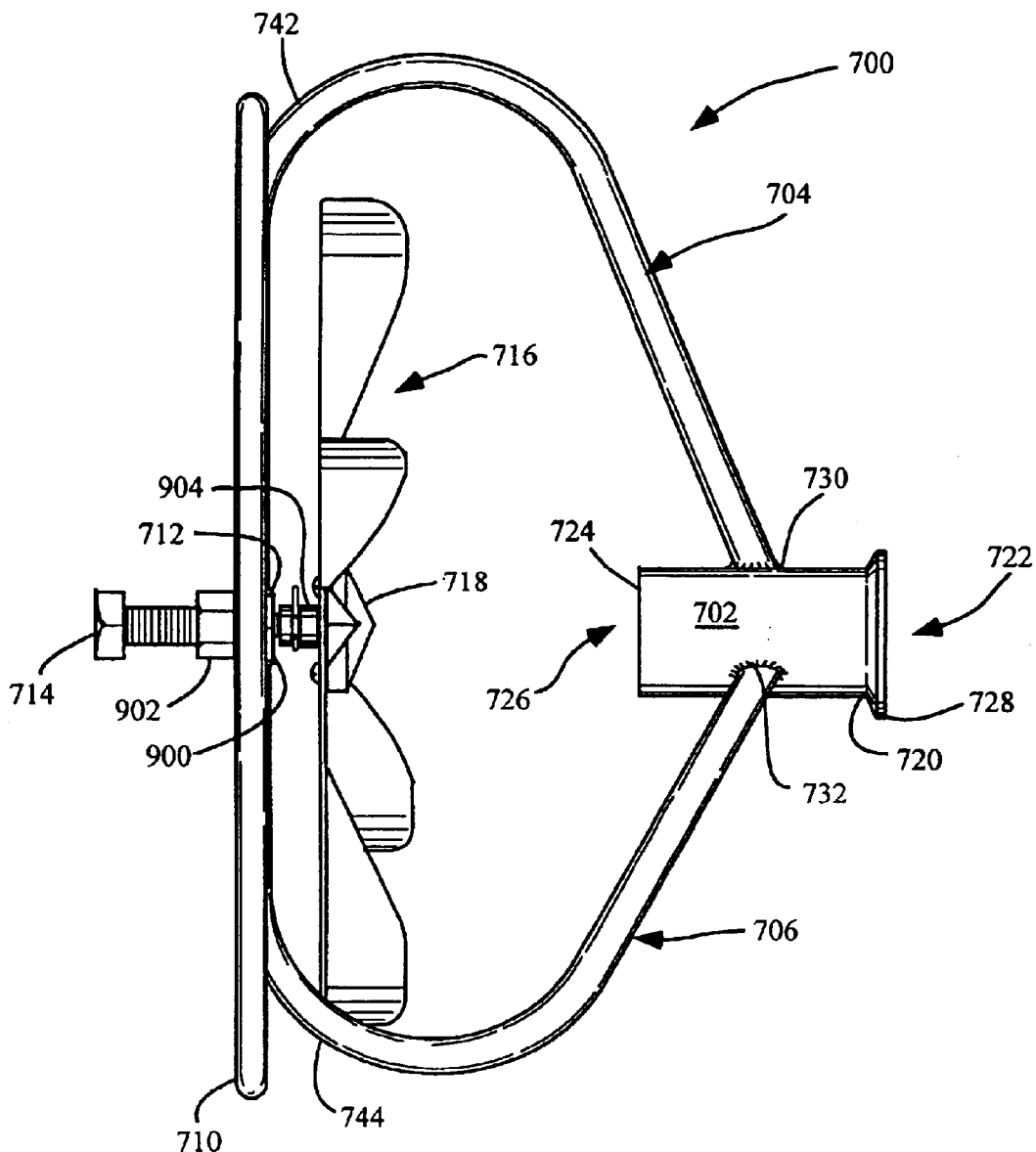
FIG. 9 is a side elevational view of the alternative embodiment of the wine sprinkler unit of FIGS. 7 and 8.

Referring next to FIG. 9, shown is a side elevational view of the alternative embodiment of the wine sprinkler 700 of FIGS. 7 and 8. In particular, shown are the nozzle 702, the first support arm 704, the second support arm 706, the third support arm 708, the threaded nut 712, and the bolt 714 having a spindle 900 on one end, the vane structure 716, and a conical structure 718.

The threaded nut 712 forms second ends 730, 732, 734 of the support arms 704, 706, 708, i.e., the second ends 730, 732, 734 come together and are welded to the threaded nut 712, against which the other threaded nut 902 is juxtaposed, but is rotatable with respect thereto. The bolt 714 is screwed through the threaded nut 712 forming the second ends 730, 732, 734 of the support arms 704, 706, 708, allowing adjustment of the length of the portion of the bolt 714 that extends toward the outlet opening 726 by rotation of the bolt 714. The other threaded nut 902 is tightened against the threaded nut 712 in order to lock the bolt 714 in place. Notatably, attached to the spindle 900 located at a distal end of the bolt 714 is the vane structure 716 comprising a plurality of vanes (four in accordance with the present embodiment). The plurality of vanes form the vane structure 716 having an axis of rotation that is aligned through the center of the inlet opening 722 and the outlet opening 726 of the nozzle 702, and is further aligned with the central axis of the bolt 714.

Figure 10:
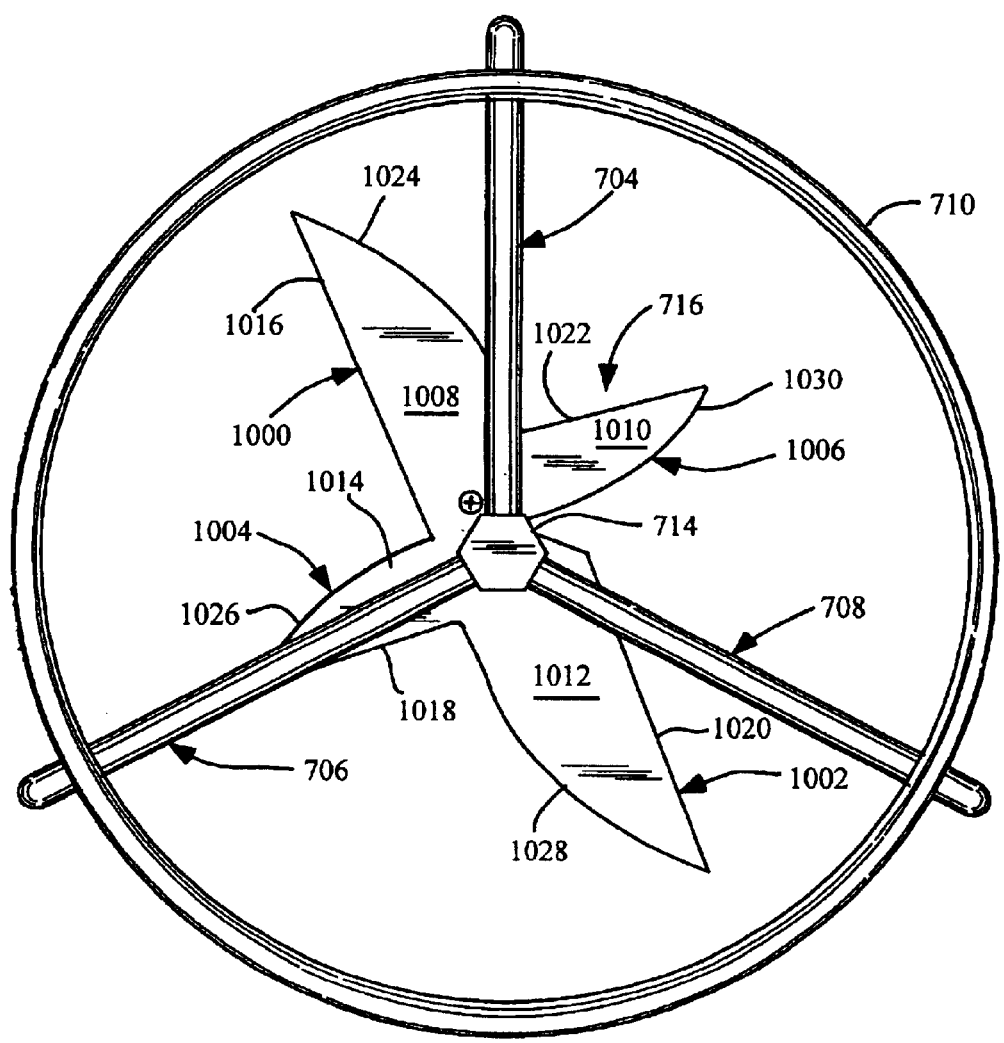
FIG. 10 is a bottom planer view of the alternative embodiment of the wine sprinkler unit of FIGS. 7 and 8.
Figure 11:
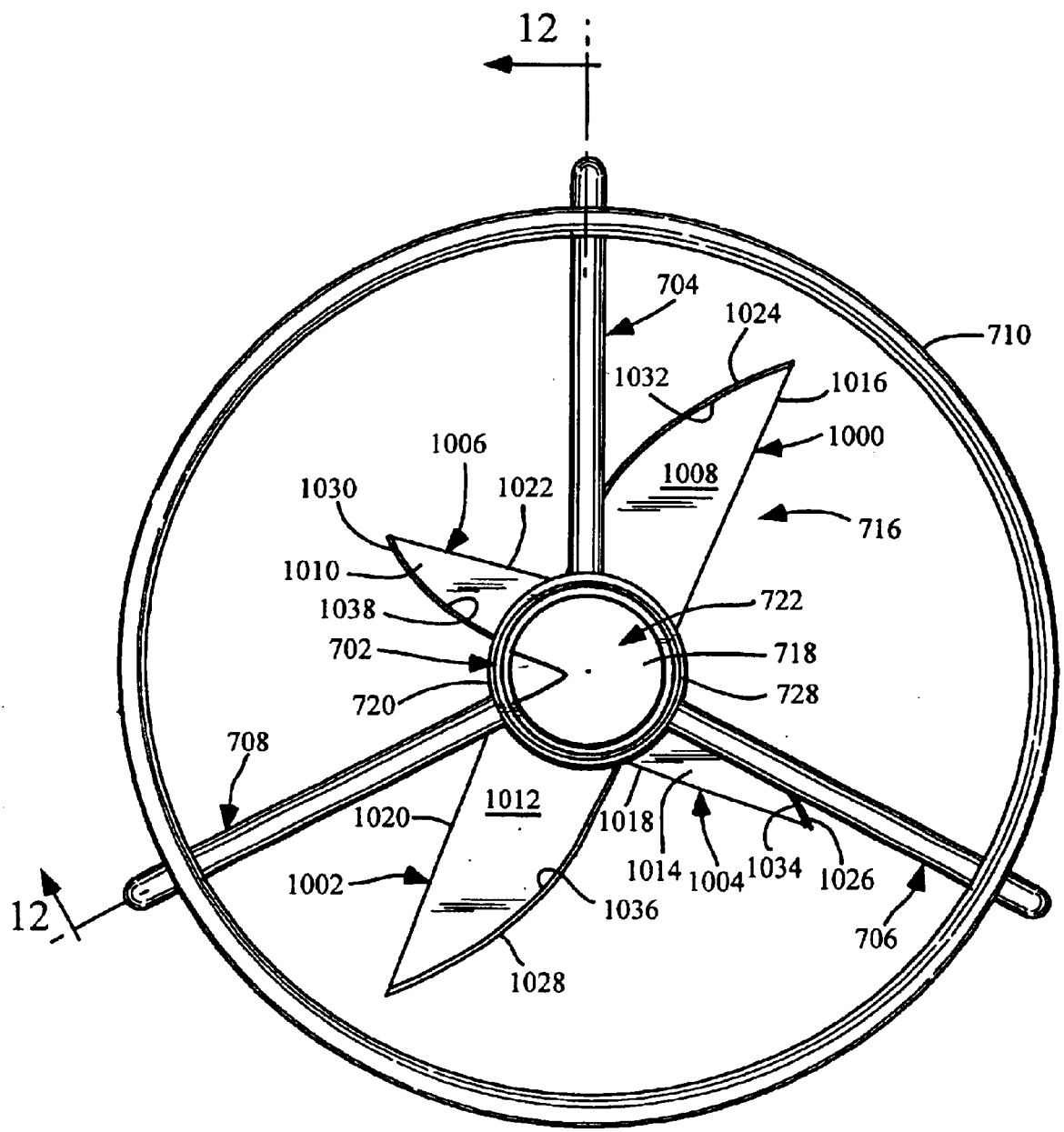
FIG. 11 is a top planer view of the alternative embodiment of the wine sprinkler unit of FIGS. 7 and 8.

Referring next to FIGS. 10 and 11, shown are bottom and top planer views, respectively of the wine sprinkler unit 700 of FIGS. 7 and 8. In particular, shown are the nozzle 702, the first support arm 704, the second support arm 706, the third support arm 708, the guard ring 710, the bolt 714, the vane structure 716, and a conical structure 718. The vane structure 716 in part comprises two longer vanes 1000, 1002 of substantially the same radial length and two shorter vanes 1004, 1006 which are both approximately two-thirds the length of the longer vanes 1000, 1002. Each vane has a support arm 1008, 1010, 1012, 1014, the planar surface of which is substantially perpendicular to the axis of rotation. Each vane support arm has a straight edge 1016, 1018, 1020, 1022 and a curved edge 1024, 1026, 1028, 1030 that extend radially outward roughly perpendicular to the axis of rotation, and which meet at a point defining the outward end of each vane. Along the curved edge 1024, 1026, 1028, 1030 of each vane is a face portion 1032, 1034, 1036, 1038 of the vane. The face portion 1032, 1034, 1036, 1038 of the vane is substantially perpendicular to the planer surface of the vane support arm 1008, 1010, 1012, 1014, and gradually increases in height as it extends toward the outward end of the vane support arm 1008, 1010, 1012, 1014.

Figure 12:
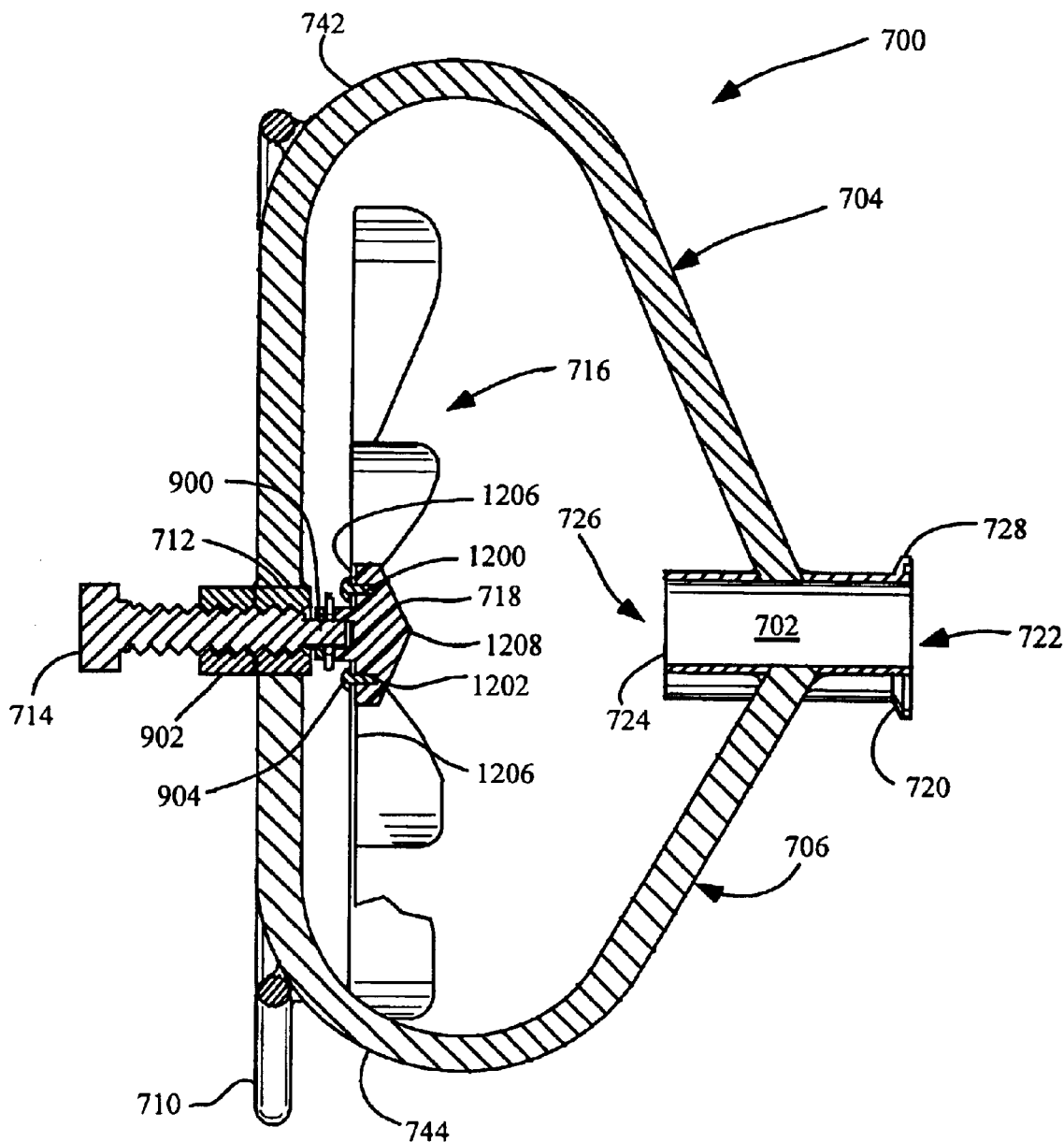
FIG. 12 is a side cross-sectional view of the alternative embodiment of the wine sprinkler unit of FIGS. 7 and 8.

Referring next to FIG. 12, shown is a side cross-sectional view of the wine sprinkler unit 700 of FIGS. 7 and 8. In particular, shown are the nozzle 702, the first support arm 704, the second support arm 706, the third support arm 708, the guard ring 710, the threaded nut 712, the bolt 714 having a spindle 900 on one end, the vane structure 716, and the conical structure 718. Also shown is the other threaded nut 902.

The conical structure (cone) 718, preferably is made of plastic and is attached to a center of the vane structure 716 by two screws 1200, 1202. The base 1204 of the cone 718 abuts the top planer surface 1206 of the vane structure 716 such that the tip 1208 of the cone 718 points up toward the outlet opening 726 of the nozzle 702 and is coaxial with the axis of rotation of the vane structure 716. A notch 1210 in the side of the cone and a matching notch 1212 of the same shape in the vane structure can be seen in FIGS. 7 and 8. The edges of the matching notch 1212 in the vane structure are aligned flush with the edges of the notch 1210 in the cone 718 and are perpendicular to the axis of rotation.

Except as noted hereinabove, the structure of the alternative embodiment of the wine sprinkler unit 700 is identical to the structure and operation of the wine sprinkler unit described in reference to FIGS. 1 through 6. While the invention herein disclosed has been described by means of specific embodiments and applications thereof, numerous modifications and variations could be made thereto by those skilled in the art without departing from the scope of the invention set forth in the claims.

What is claimed is:

1. A sprinkler for a fermenting system comprising:

a nozzle having an inlet opening and an outlet opening;

a support arm having a first end attached to the nozzle, the support arm shaped in a fashion to position a second end of the support arm substantially centered below the outlet opening of the nozzle;

a plurality of vanes forming a vane structure rotatably attached to the second end of the support arm having an axis of rotation through the center of the inlet opening and outlet opening, the plurality of vanes extending outward and radially from a center of the vane structure, and the support arm also shaped in a fashion to not interfere with rotation of the vane structure; and a conical shaped structure attached to a center of a top planar surface of the vane structure;

a notch in the side of the conical structure; and a matching notch in the vane structure of the same shape is the notch in the side of the conical structure wherein vertical edges of the matching notch in the vane structure are aligned flush with vertical edges of the notch in the cone.

2. The sprinkler of claim 1, wherein the vane structure is comprised of:

two longer vanes of substantially the same radial length; and two shorter vanes of substantially the same radial length and which are both shorter than the longer vanes.

3. The sprinkler of claim 2, wherein each vane comprises:

a support arm, a planar surface of which is substantially perpendicular to an axis of rotation of the vane structure, the support arm having a straight edge and a curved edge that extend radially outward perpendicular to the axis of rotation meeting at a point defining an outward end of the vane; and a face portion of the vane running along the edge of the curved portion of the vane and substantially perpendicular to the planar surface of the vane support arm and gradually increasing in height as the face portion extends toward the outward end of the vane support arm.

4. The sprinkler of claim 3, further comprising:

means for adjusting a distance between the vane structure and the outlet opening.

5. The sprinkler of claim 1 wherein said nozzle has a taper such that the inlet is larger than the outlet.

6. The sprinkler of claim 1 wherein said support arm is coupled to the plurality of vanes beneath the plurality of vanes.

7. The sprinkler of claim 1 wherein said support arm is coupled beneath the plurality of vanes at said axis of rotation.

8. The sprinkler of claim 1 further comprising a recirculating pump coupled to the inlet.

9. A fermenting system comprising:

a tank suitable for fermenting wine;

means for transporting wine within the tank to a nozzle having an inlet opening and an outlet opening, the nozzle centrally located at the top of the tank and operably attached to the transporting means;

a support arm having a first end attached to the nozzle, the support arm shaped in a fashion to position a second end of the support arm substantially centered below the outlet opening of the nozzle;

a plurality of vanes forming a vane structure rotatably attached to the second end of the support arm having an axis of rotation through the center of the inlet opening and outlet opening, the plurality of vanes extending outward and radially from a center of the vane structure, and the support arm also shaped in a fashion to not interfere with rotation of the vane structure;

a conical shaped structure attached to a center of a top planar surface of the vane structure;

a notch in the side of the conical structure; and a matching notch in the vane structure of the same shape as the notch in the side of the conical structure wherein vertical edges of the matching notch in the vane structure are aligned flush with vertical edges of the notch in the cone.

10. The fermenting system of claim 9, wherein the vane structure is comprised of:

two longer vanes of substantially the same radial length; and two shorter vanes of substantially the same radial length and which are both shorter than the longer vanes.

11. The fermenting system of claim 10, wherein each vane comprises:

a support arm, a planar surface of which is substantially perpendicular to an axis of rotation of the vane structure, the support arm having a straight edge and a curved edge that extend radially outward perpendicular to the axis of rotation meeting at a point defining an outward end of the vane; and a face portion of the vane running along the edge of the curved portion of the vane and substantially perpendicular to the planar surface of the vane support arm and gradually increasing in height as the face portion extends toward the outward end of the vane support arm.

12. The fermenting system of claim 11, further comprising:

means for adjusting a distance between the vane structure and the outlet opening.

13. A system for dispersing a fermenting liquid across a surface of a body of said liquid comprising:

an inlet having a central axis;

at least one surface for redirecting a flow of the fermenting liquid through the inlet from a substantially axial direction to a substantially radial direction;

at least one surface for dispersing the flow of the fermenting liquid having been redirected both in a first region, relatively closer to said axis, and in a second region, relatively farther from said axis, as the flow of the fermenting liquid having been redirected falls by gravity in an axial direction;

an outlet;

a fluid conduit between said inlet and the outlet;

a support arm coupled between said fluid conduit and said at least one surface for redirecting; and another support arm coupled between said fluid conduit and said at least one surface for redirecting.

14. A system for dispersing a fermenting liquid across a surface of a body of said liquid comprising:

an inlet having a central axis;

at least one surface for redirecting a flow of the fermenting liquid through the inlet from a substantially axial direction to a substantially radial direction;

at least one surface for dispersing the flow of the fermenting liquid having been redirected both in a first region, relatively closer to said axis, and in a second region, relatively farther from said axis, as the flow of the fermenting liquid having been redirected falls by gravity in an axial direction;

an outlet;

a fluid conduit between said inlet and the outlet;

a support arm coupled between said fluid conduit and said at least one surface for redirecting; and a guard coupled to said support arm for protecting said surface for dispersing.

* * * * *